2 Sheets—Sheet 1.

J. T. WAINWRIGHT.

MACHINE FOR EXHAUSTING MOLTEN METAL.

No. 11,671. Reissued June 21, 1898.

Witnesses.
Paul Willis
Arthur J. T. Bennett.

Inventor.
Jacob T. Wainwright.

2 Sheets—Sheet 2.

J. T. WAINWRIGHT.

MACHINE FOR EXHAUSTING MOLTEN METAL.

No. 11,671. Reissued June 21, 1898.

Witnesses.
Paul Willis.
Arthur J. T. Bennett.

Inventor.
Jacob T. Wainwright.

UNITED STATES PATENT OFFICE.

JACOB T. WAINWRIGHT, OF CHICAGO, ILLINOIS.

MACHINE FOR EXHAUSTING MOLTEN METAL.

SPECIFICATION forming part of Reissued Letters Patent No. 11,671, dated June 21, 1898.

Original No. 598,037, dated January 25, 1898. Application for reissue filed April 22, 1898. Serial No. 678,480.

*To all whom it may concern:*

Be it known that I, JACOB T. WAINWRIGHT, a citizen of the United States, residing at Chicago, in the county of Cook and State of Illinois, have invented new and useful Improvements in Machines for Exhausting Molten Metal, of which the following is a specification.

The object of my invention, as hereinafter claimed, is the production of an improvement wherewith an unlimited quantity of gas is extracted with a thorough exhaustion of a self-regulating inflow and outflow of molten metal. I accomplish this by means of the combination of elements set forth in the claim.

The accompanying drawings are merely conventional, and show a preferred device.

Figure 1:
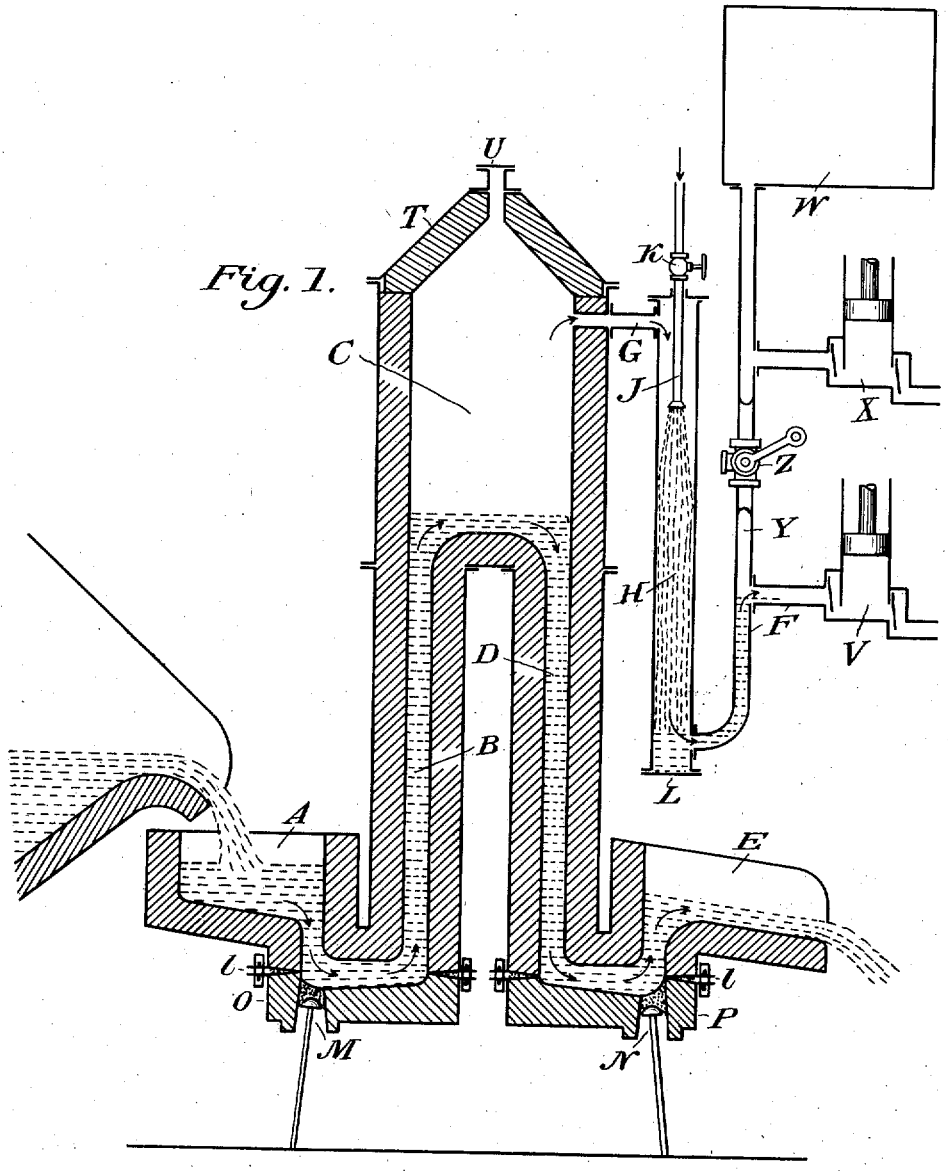
Fig. 1, shows a central vertical longitudinal section, the inlets and outlets and their seals, and the remaining parts connected thereto by the pipe G.
Figure 2:
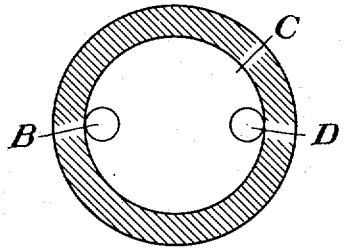
Fig. 2, shows a sectional plan of the vacuum-chamber, above its bottom.
Figure 3:
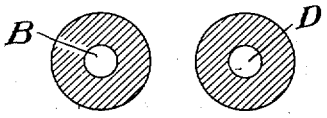
Fig. 3, shows a sectional plan of the inlet and outlet conduits to the vacuum-chamber, below its bottom.

In the device shown, an elevated vacuum or gas chamber is shown at C.

To said chamber is attached a device for exhausting the air and gases, as here shown, an air or gas exhaust pump V; by means of pipe F; H; G; and a pipe Y forming a continuation of said pipe F, provided with a three-way cock Z, arranged for either a straight open passage, or to let in air, either above or below it; and above said cock is a secondary chamber W and exhaust air-pump X thereto.

Said pipe H is of enlarged diameter and provided with a jet J controlled by a cock K, through which water flows to condense the gases drawn from the chamber C. It also has a removable cleansing bottom L.

The exhausted chamber W may be closed by the cock Z; and at a subsequent start furnish immediate exhaustion to the chamber C, which may thereafter be upheld by either one or both of said pumps.

To said chamber C is also attached an inlet conduit B, with an inverted lower end provided with a receiving cup A, and a luted outlet plug M at its lower point; and an outlet conduit D, with an inverted lower end with spout E, and a luted outlet plug N, at its lower point. Said inverted ends form seals to the chamber C, when charged with liquid metal. Said plugs or stopped openings are for the purpose of removing the liquid seals.

The parts or bottoms, O, P, are separable from the upper part at the luted joints l.

The roof T is removable; and provided with an opening U covered with mica, through which the chamber may be inspected. When the apparatus is empty, it is desirable to maintain an elevated temperature in the interior by means of a blast of gas and air introduced through this opening U.

The inside of the apparatus is made in part, or in whole, of suitable acid, neutral, or basic material; and the various parts are incased, connected, luted, and cooled; all in accord with known practice in the construction and operation of metallurgical furnaces or receptacles.

The height at which the bottom of the chamber C may be above the top of the seals will depend on the specific gravity of the metal, and the degree of exhaustion obtained in said chamber. The difference of level in the cups A, E, directs the flow as indicated.

To operate said device the cups A, E, are first filled with molten metal, the chamber C is exhausted, in either or both of said ways; and metal poured into the receiving cup A, from which it flows through the inlet B, and over the elevated bottom of the vacuum chamber C, and is deprived of its occluded gases, thence through the outlet D, into the cup E, from which it may be cast.

What I claim is—

In combination with an exhauster; a connected vacuum-chamber with an elevated bottom, a trap inlet, and a trap outlet; substantially.

JACOB T. WAINWRIGHT.

Witnesses:

WM. ZIMMERMAN,

KIRK A. DUTTON.